R. S. CROSS.
SHOCK ABSORBER FOR FIREARMS.
APPLICATION FILED MAR. 30, 1916.

1,187,269. Patented June 13, 1916.

Raymond S. Cross,
Inventor

By Geo. P. Kimmel,
Attorney.

UNITED STATES PATENT OFFICE.

RAYMOND S. CROSS, OF WESTPORT, NEW YORK.

SHOCK-ABSORBER FOR FIREARMS.

1,187,269.  Specification of Letters Patent.  Patented June 13, 1916.

Application filed March 30, 1916. Serial No. 87,776.

*To all whom it may concern:*

Be it known that I, RAYMOND S. CROSS, a citizen of the United States, residing at Westport, in the county of Essex and State of New York, have invented certain new and useful Improvements in Shock-Absorbers for Firearms, of which the following is a specification.

An object of my invention is to provide a shock absorber for fire arms having comparatively few parts, the shock absorber being placed on the end of the gun stock and forming the shoulder engaging portion thereof.

Another object of my invention is to provide a shock absorber of the class described which may be quickly and easily applied to any of the usual forms of gun stocks by slightly modifying the end of the stock.

A further object of my invention is to provide a gun stock shock absorber of the class described which readily absorbs all shocks incident to the discharge of the fire arm without the provision of springs or other unreliable metal parts.

Figure 1:
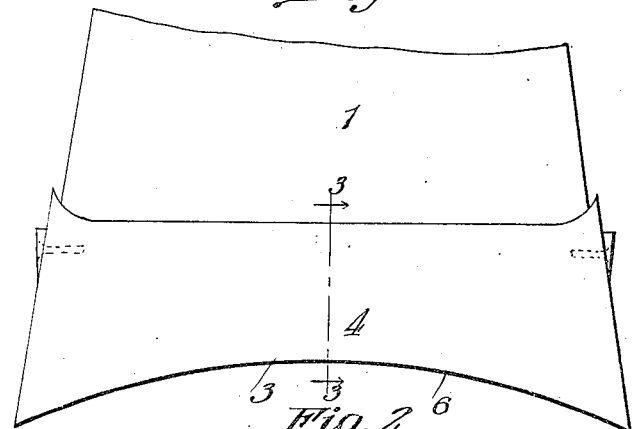
Figure 2:
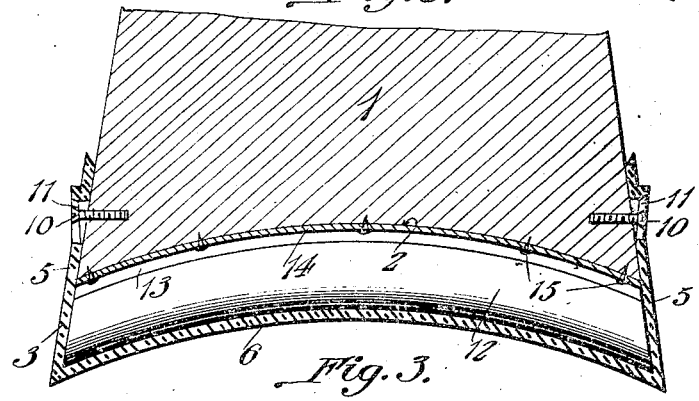
Figure 3:
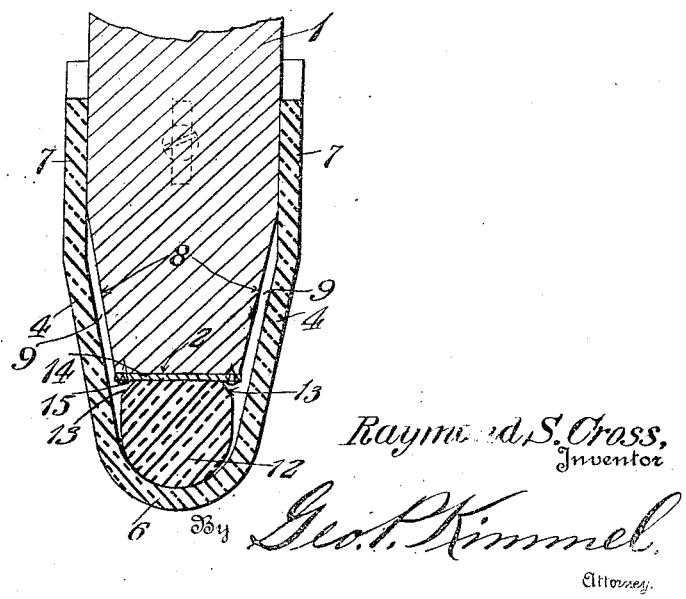

Other objects and advantages to be derived from the use of my improved fire arm shock absorber will appear from the following detail description and the claims, taken with an inspection of the accompanying drawings, in which Figure 1 is a fragmental side elevation of a gun stock showing my improved shock absorber applied thereto, Fig. 2 is a longitudinal sectional view through said shock absorber, the shock absorbing elements being shown in elevation, and Fig. 3 is a transverse sectional view taken on the line 3—3 of Fig. 1, looking in the direction of the arrows.

Referring more particularly to the drawing, in which similar characters of reference designate like and corresponding parts through the various views, 1 designates the usual gun stock, in the present instance having the curved end surface 2. My improved shock absorber has been shown and applied to a gun stock having a curved end surface but it will be readily understood from the following description that with slight modification the shock absorber may be applied to straight end surface stocks.

The shock absorber comprises a shoulder engaging member 3 preferably formed of hard rubber or the like and having divergent side walls 4 and converging end walls 5. The shoulder engaging portion 6 of the member 3 is curved throughout its length as best shown in Figs. 1 and 2 and semi-circular in cross section as shown in Fig. 3. The divergent walls 4 of the shoulder engaging member 3 terminate in parallel portions 7 which preferably snugly embrace the sides of the gun stock 1. The gun stock is tapered as at 8 to provide a space 9 between said stock and the member 3 for a purpose which will hereinafter appear. The member 3 is guided in movement on the gun stock by means of screws 10 operating in complementary slots 11 in the end walls 5. I do not lay any particular stress on the manner of slidably securing the shoulder engaging member on the gun stock since this may be modified within the scope of the invention.

The shock absorbing element of my invention is preferably formed of rubber, gutta-percha, or some similar resilient material and comprises in the present instance a curved substantially semi-cylindrical body 12 having beveled edges 13, said body being cemented by any suitable adhesive material to a canvas strip 14 fastened to the gun stock by means of tacks 15 or the like. The beveled edges 13 permit tacking of the canvas to the gun stock. It will be noted that while the shape of the body 12 longitudinally conforms substantially to the shape of the gun stock end and shoulder engaging member the shape of said body in cross section is such that space is provided between the same and the shoulder engaging member, whereby to permit expansion of the body 12 when subjected to a shock.

The operation of the invention it is thought will be clear from the foregoing description and it will be noted that there is an entire absence of metal from the construction of the device, with the exception of the fastening screws 10 and tacks 15, thereby permitting the gun stock to be placed on the ground in moisture without danger of rust.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

1. In a device of the class described, the combination with a gun stock, of a hollow shoulder engaging member, shock absorbing means carried therein comprising a body of resilient material, and a fastening strip associated therewith to connect said body with said gun stock.

2. In a device of the class described, the combination with a gun stock, of a hollow shoulder engaging member, means for fastening said shoulder engaging member slidably to said stock, shock absorbing means associated therewith comprising a resilient body having a fastening strip associated therewith, said body being interposed between said stock and said shoulder engaging member for the purpose specified.

3. In a device of the class described, the combination with a gun stock, of a hollow shoulder engaging member having divergent walls and means for slidably fastening said member to said stock, a shock absorbing element interposed between said shoulder engaging member and said stock comprising a body of soft rubber cemented to a strip of flexible material, said resilient body being recessed to permit fastening of said strip to said stock for the purpose specified.

In testimony whereof I affix my signature.

RAYMOND S. CROSS.